(12) United States Patent
Petersen et al.

(10) Patent No.: US 11,501,120 B1
(45) Date of Patent: Nov. 15, 2022

(54) INDICATOR CENTROIDS FOR MALWARE HANDLING

(71) Applicant: Cylance Inc., Irvine, CA (US)

(72) Inventors: Eric Glen Petersen, Beaverton, OR (US); Michael Alan Hohimer, Portland, OR (US); Jian Luan, Irvine, CA (US); Matthew Wolff, Laguna Niguel, CA (US); Brian Michael Wallace, Irvine, CA (US)

(73) Assignee: Cylance Inc., San Ramon, CA (US)

( * ) Notice: Subject to any disclaimer, the term of this patent is extended or adjusted under 35 U.S.C. 154(b) by 301 days.

(21) Appl. No.: 16/796,843

(22) Filed: Feb. 20, 2020

Related U.S. Application Data

(63) Continuation of application No. 16/534,683, filed on Aug. 7, 2019, now Pat. No. 10,810,470, which is a continuation of application No. 15/720,372, filed on Sep. 29, 2017, now Pat. No. 10,417,530.

(60) Provisional application No. 62/402,842, filed on Sep. 30, 2016.

(51) Int. Cl.
| | |
|---|---|
| *G06F 21/56* | (2013.01) |
| *G06K 9/62* | (2022.01) |
| *G06T 7/60* | (2017.01) |
| *G06N 3/08* | (2006.01) |
| *G06F 16/16* | (2019.01) |
| *G06N 3/04* | (2006.01) |
| *G06N 20/00* | (2019.01) |

(52) U.S. Cl.
CPC .......... *G06K 9/6272* (2013.01); *G06F 16/164* (2019.01); *G06N 3/0454* (2013.01); *G06N 3/08* (2013.01); *G06N 20/00* (2019.01); *G06T 7/60* (2013.01)

(58) Field of Classification Search
CPC ..... G06K 9/6272; G06F 16/164; G06F 21/56; G06F 21/561; G06F 21/562; G06F 21/566; G06N 20/00; G06N 3/0454; G06N 3/08; G06T 7/60; H04L 63/14; H04L 63/1441; H04L 63/145; H04L 63/1425
See application file for complete search history.

(56) References Cited

U.S. PATENT DOCUMENTS

| | | | |
|---|---|---|---|
| 8,826,439 B1 | 9/2014 | Hu et al. | |
| 8,935,788 B1 * | 1/2015 | Diao | G06F 21/564 |
| | | | 726/24 |
| 2013/0325759 A1 | 12/2013 | Rachevsky et al. | |
| 2013/0326625 A1 | 12/2013 | Anderson et al. | |
| 2014/0090061 A1 | 3/2014 | Avasarala et al. | |
| 2014/0298460 A1 | 10/2014 | Xue et al. | |

(Continued)

OTHER PUBLICATIONS

Office Action dated Jul. 24, 2020 for U.S. Appl. No. 16/534,683, filed Aug. 7, 2019.

(Continued)

*Primary Examiner* — Malcolm Cribbs
(74) *Attorney, Agent, or Firm* — Jones Day

(57) ABSTRACT

An artifact is received and features are extracted therefrom to form a feature vector. Thereafter, a determination is made to alter a malware processing workflow based on a distance of one or more features in the feature vector relative to one or more indicator centroids. Each indicator centroid specifying a threshold distance to trigger an action. Based on such a determination, the malware processing workflow is altered.

20 Claims, 11 Drawing Sheets

(56) References Cited

U.S. PATENT DOCUMENTS

| | | | |
|---|---|---|---|
| 2015/0058982 A1 | 2/2015 | Eskin et al. | |
| 2015/0128263 A1* | 5/2015 | Raugas | H04L 63/1433 |
| | | | 726/23 |
| 2015/0370889 A1 | 12/2015 | Chiba | |
| 2016/0335435 A1* | 11/2016 | Schmidtler | G06N 20/00 |
| 2016/0335553 A1 | 11/2016 | Battaglino et al. | |
| 2016/0364467 A1 | 12/2016 | Gupta et al. | |
| 2017/0039469 A1 | 2/2017 | Majumdar et al. | |
| 2017/0193229 A1 | 7/2017 | Chowdhury et al. | |
| 2017/0212650 A1 | 7/2017 | Sinyagin et al. | |
| 2017/0286522 A1 | 10/2017 | Hohwald et al. | |
| 2017/0330099 A1* | 11/2017 | de Vial | G06Q 40/04 |
| 2018/0039822 A1 | 2/2018 | Semitsu et al. | |

OTHER PUBLICATIONS

Office Action dated Apr. 30, 2019 for U.S. Appl. No. 15/720,372, filed Sep. 29, 2017.

Kruczkowski et al., "Support Vector Machine for Malware Analysis and Classification." IEEE/WIC/ACM International Joint Conferences on Web Intelligence (WI) and Intelligent Agent Technologies (IAT) [online], 2014[retrieved on Apr. 24, 2019].

Non-Final Office Action issued on U.S. Appl. No. 17/024,439 dated Jun. 9, 2022 (9 pages).

* cited by examiner

INDICATOR CENTROIDS FOR MALWARE HANDLING

RELATED APPLICATIONS

This application is a continuation-in part of U.S. patent application Ser. No. 16/534,683 filed on Aug. 7, 2019 which, in turn, is a continuation of U.S. patent application Ser. No. 15/720,372 (now U.S. Pat. No. 10,417,530) filed on Sep. 29, 2017 which, in turn, claims priority to U.S. Pat. App. Ser. No. 62/402,842 filed on Sep. 30, 2016, the contents of each of which are hereby fully incorporated by reference.

TECHNICAL FIELD

The subject matter described herein relates generally to machine learning and more specifically to the use of indicator centroids for improving machine learning classification and information retrieval (also referred to herein as "info" retrieval) workflows.

BACKGROUND

In order to detect malicious software (e.g., viruses, worms, Trojan horses, spyware, and/or programming that gathers information about a computer/user without permission), computer systems may utilize file classification systems to identify files with certain characteristics which make it likely that the files are malicious. Although simple file classification systems may be computationally conservative, they may be over-inclusive and improperly classify clean files as malicious. Similarly, simple file classification systems may be under-inclusive, and improperly classify malicious files as clean. Thus, systems with a greater ability to detect and classify malicious and/or clean files can be desirable.

SUMMARY

In a first aspect, an artifact is received and features are extracted therefrom to form a feature vector. Thereafter, a determination is made to alter a malware processing workflow based on a distance of one or more features in the feature vector relative to one or more indicator centroids. Each indicator centroid specifying a threshold distance to trigger an action. Based on such a determination, the malware processing workflow is altered.

The feature vector can be inputted into at least one machine learning model trained to generate a score that characterizes whether the artifact comprises malicious code. The artifact can be prevented from being accessed, being executed or from continuing to execute when the at least one machine learning model indicates that the artifact comprises malicious code.

The altering can take various forms such as transmitting one or more of the original artifact or the feature vector to one or more remote computing systems based on an action or actions specified by one or more of indicator centroid. Using this information, the remote computing system(s) can provide a classification of the artifact. In some variations, the classification is performed using at least one machine learning model.

The altering can include providing a notification based on an action specified by a corresponding indicator centroid. The notification, for example, can include one or more of causing the notification to be displayed in an electronic visual display, storing the notification in physical persistence, loading the notification in memory, or transmitting the notification to a remote computing device. In addition or in the alternative, altering the score generated by the at least one machine learning model can be based on an action specified by a corresponding indicator centroid.

Systems, methods, and articles of manufacture, including computer program products, are also provided for use of centroids for classification and information retrieval. In some example embodiments, there is provided a system that includes at least one processor and at least one memory including program code which when executed by the at least one memory provides operations. The operations can include classifying a plurality of files as malicious or not malicious based on a function dividing a coordinate space into at least a first portion and a second portion, wherein the first portion includes a first subset of the plurality of files classified as malicious. The operations can further include defining one or more first centroids in the first portion that classifies files from the first subset as not malicious. The operations can further include determining whether a file is malicious based on whether the file is located within the one or more first centroids.

In some variations, one or more features disclosed herein including the following features can optionally be included in any feasible combination. In some embodiments, the second portion can include a second subset of the plurality of files classified as not malicious, and/or the operations can further comprise defining one or more second centroids in the second portion that classifies files from the second subset as malicious. In accordance with these embodiments, determining whether the file is malicious can further comprise determining whether the file is located within a region of the second portion that does not include the one or more second centroids. If the file is located within the one or more first centroids the file may be classified as not malicious. Similarly, if the file is located within a region of the second portion that does not include the one or more second centroids, the file may be classified as not malicious.

In various embodiments, the operations can further comprise determining a plurality of attributes of the plurality of files, and/or mapping the plurality of files in a positive portion of the coordinate space defined by an intersection of at least two of the plurality of attributes. In some embodiments, the operations can further comprise identifying a plurality of clusters from the plurality of files, determining whether any of the plurality of clusters do not include known malicious files, and/or defining individual centroids around each of the plurality of clusters which do not include known malicious files, wherein the one or more first centroids includes the individual centroids. In related embodiments, the operations can further comprise determining whether any of the individual centroids include a radius greater than a threshold value, reducing the radius of the individual centroids which are greater than the threshold value such that the radius is less than or equal to the threshold value, and/or re-defining (e.g., after the reducing) the individual centroids which no longer include all files from a respective cluster of the plurality of clusters, where the re-defining includes defining multiple smaller centroids in place of the individual centroids.

In some embodiments, the one or more first centroids can include a circular geometry having a center point and a radius, and the file can be determined to be located within the one or more first centroids when a distance between the center point and a location of the file is less than or equal to the radius. In some aspects, the center point can be determined based on averaging locations for each of the plurality of files located within the one or more first centroids. In some aspects, the center point can be determined based on shared attributes for each of the plurality of files located within the one or more first centroids. In some aspects, the radius can be determined based on a maximum Euclidian distance between each of the plurality of files located within the one or more first centroids.

Additional systems, methods, and articles of manufacture, including computer program products, are provided for use of centroids for classification and information retrieval. In some example embodiments, there is provided a system that includes at least one processor and at least one memory including program code which when executed by the at least one memory provides operations. The operations can include searching for one or more clusters among a plurality of files in a coordinate space. The operations can further include defining one or more centroids around the one or more clusters, the one or more centroids classifying a set of files within the one or more clusters as belonging to a specific classification type. The operations can further include classifying a file as belonging to the specific classification type when the file is located within the one or more first centroids.

In some variations, one or more features disclosed herein including the following features can optionally be included in any feasible combination. In some embodiments, the specific classification type includes one or more of safe, suspect, benign, unsafe, malicious, non-malicious, downloader, Trojan, and adware. In some embodiments, the operations can further comprise determining a plurality of attributes of the plurality of files, and/or mapping the plurality of files in the coordinate space, wherein the coordinate space is defined by an intersection of at least two of the plurality of attributes.

In various embodiments, the one or more first centroids include a circular geometry having a center point and a radius. In related embodiments, the operations can further comprise determining whether the file is located within the one or more first centroids based on whether a distance between the center point and a location of the file is less than or equal to the radius. In some aspects, the center point can be determined based on averaging locations for each of the plurality of files located within the one or more first centroids. In some aspects, the center point can be determined based on shared attributes for each of the plurality of files located within the one or more first centroids. In some aspects, the radius can be determined based on a maximum Euclidian distance between each of the plurality of files located within the one or more first centroids.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
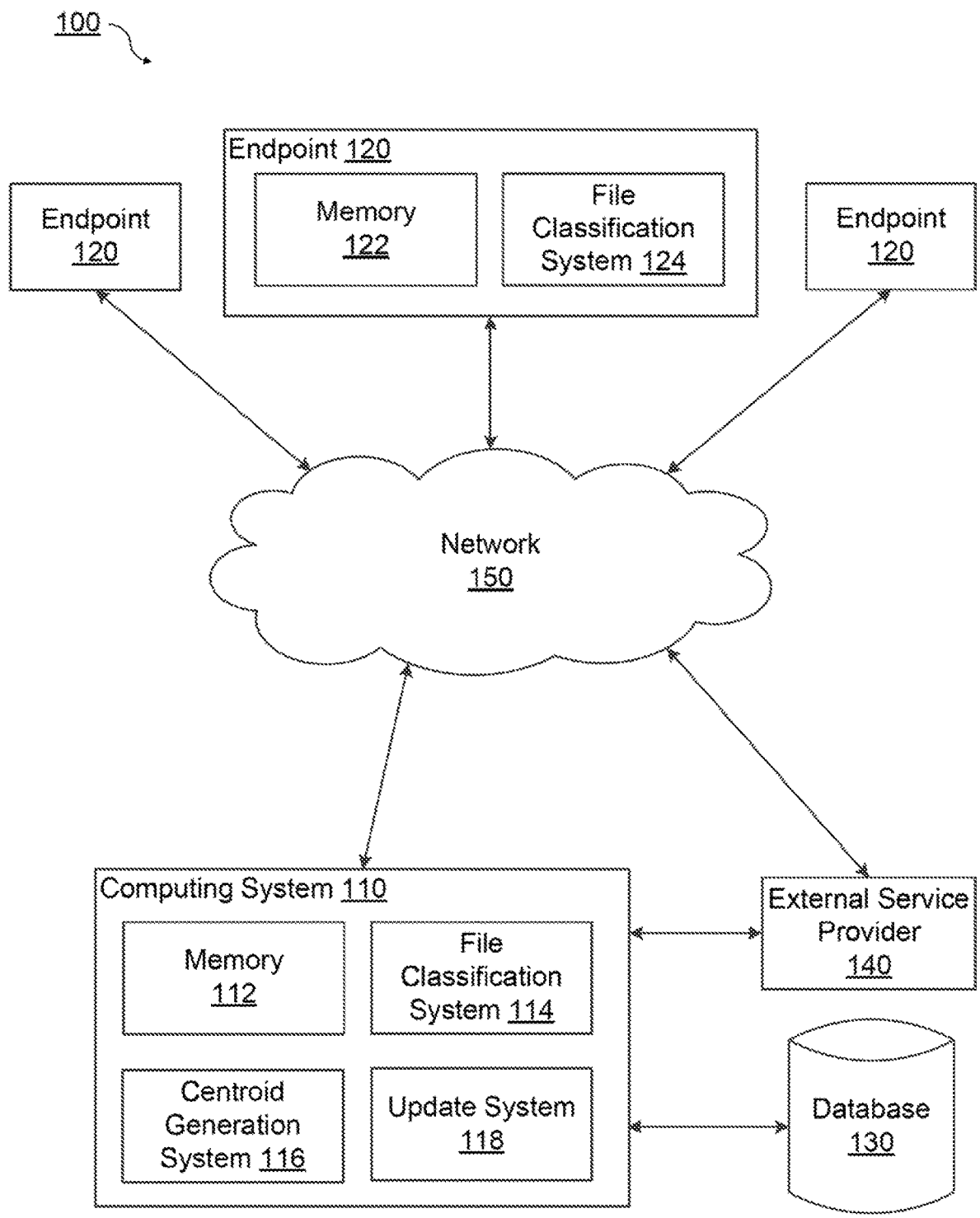
FIG. 1 illustrates an example of a system in which file classification and information retrieval solutions may be implemented.

Users run software programs with a variety of capabilities on endpoints. An endpoint can include one or more of a personal computer, a smart phone, a tablet, and/or the like. Certain software programs and/or files can include malicious code (referred to herein as "malware"), which can be harmful to the user and/or the endpoint. Therefore, in order to protect themselves from malware, users can install or otherwise utilize malware detection software on or through the endpoint.

Computer programs are typically compiled to generate executable programs. The compilation process transforms the computer program from source code to object code. While source code is written in a high-level, human-readable programming language (e.g., C, Java), object code is in a binary format that is not immediately comprehensible. Although object code can be transformed into human-readable form in a process known as disassembly, a human operator cannot efficiently and reliability detect malicious computer programs by inspecting the disassembled object code.

However, in some aspects, attributes of computer programs or files may be derived from object code or may be predefined. An attribute can refer to any salient data point that can be measured from a sample. Attributes characterizing a file and/or the environment in which the file is being, read, downloaded, executed, written to, etc. can be collected or otherwise accessed. For example, binary files may be reviewed and/or classified based on one or more attributes associated with the file. Determined attributes can include binary attributes, integer attributes, and/or the like. For example, attributes can include information/indications relating to a file size, a number of file headers, a portable execution (PE) checksum, debugging, an operating system or image version, a number of sections, entropy of code sections, a number of resources, an entry point, registry keys, registry startup keys, networking related dynamic link libraries (DLL), high frequency DLLs in benign files, file size, and/or any characteristic of a file which may be relevant to classification of a file.

Once attributes of a file are determined, the file may be mapped in a coordinate space defined by at least some of the attributes. Models/mapping can be used to define the likelihood of any sample to be classified in a particular class. For example, based upon where the files are mapped in the attribute coordinate space, the files may be classified as malicious, benign, clean, safe, etc. As used herein, the terms "safe" and "unsafe" can generally refer to a machine-generated, relative classification based on an estimate of the danger presented by one or more files that could be a threat. In some embodiments a threat score can be generated for a given file, which can be used to classify the file as safe or unsafe. Other classification protocols with more than two divisions are also within the scope of the current subject matter. In non-limiting examples, threat score outputs from one or more machine learning threat discernment models can be used to classify potential threats in several categories (e.g. safe, suspect, benign, unsafe, malicious, downloader, Trojan, adware, and/or the like).

However, general determinations based on locations in a mapping may not always be accurate. Therefore, machine learning may be utilized to increase the accuracy of these determinations, as described herein. For example, in some aspects, a convolutional neural network (CNN) can be utilized to analyze the disassembled binary file including by applying a plurality of kernels adapted to detect certain sequences of instructions in the disassembled binary file. In some implementations, a convolutional neural network can be trained to detect malware by applying one or more supervised learning and/or optimization techniques. For instance, training a convolutional neural network can include utilizing the convolutional neural network to process a plurality of training files. The training files can be disassembled binary files with known classifications (e.g., as malicious or benign), and the convolutional neural network can be utilized to process training files and generate corresponding training outputs.

For example, samples can be analyzed to provide predictive outputs regarding the likelihood of a given file being a threat. Samples can refer to any piece of data upon which classifying or similarity analysis operations against similar samples can be performed.

Training the convolutional neural network can include applying one or more supervised learning and/or optimization techniques to minimize the error associated with the training outputs (e.g., relative to the known classifications). In some embodiments, a trained convolutional neural network can be provided to detect malicious executables by determining classifications of unknown disassembled binary files.

In some aspects, based upon a classification (e.g., based upon a location in a mapping) a decision can be made as to whether or not to allow the file to execute, be downloaded, opened, etc. If it is determined that the file should not execute or some other action with the file should be prevented, a process or module can take action to prevent the file from executing, opening, continuing to execute, writing, being downloaded, and/or the like. In some implementations, the file can be quarantined if it is assessed as a potential threat.

By carefully selecting and training the machine learning threat discernment models in an ensemble of such models, a threat discernment system can act resiliently against change over time, accommodating small and large changes in program behaviors that resemble "safety" or a lack thereof. Machine learning threat discernment models may be characterized by one or more algorithms incorporated therein, which may include, as illustrative examples, neural networks, support vector machines, logistic regression models, Bayesian algorithms, and decision trees. Consistent with the current subject matter, machine learning models can implemented as both cloud-based instances and locally running instances (e.g. at one or more endpoint computers of an organization).

FIG. 1 illustrates an example of a system 100 in which file classification and information retrieval solutions may be implemented. As illustrated, an endpoint 120 may communicate with other endpoints 120, a computing system 110, and/or an external service provider 140 through the use of a network 150. The endpoint 120 may include one or more of a phone, mobile device, tablet, personal computer, or other device. In accordance with various embodiments, the endpoint 120 may operate according to an iOS, Android, Mac, Windows, Linux, or other operating system. The network 150 can include one or more of a local area network (LAN), a wireless LAN (WLAN), a personal area network (PAN), a wide area network (WAN), a cellular network, the Internet, and/or the like. In some aspects, an endpoint 120 may communicate directly with other devices through Bluetooth (e.g., low energy) communications, Near-field communications (NFC), ZigBee communications, a universal serial bus (USB), wireless USB, device-to-device communications, and/or the like.

As further illustrated, an endpoint can include a memory 122 and a file classification system 124. The memory 122 can be configured to hold a plurality of files, in addition to executable software for controlling the operation of the endpoint 120. The file classification system 124 may include software and/or hardware components, and may be configured to operate in accordance with the procedures described herein. For example, in various embodiments, the file classification system 124 may be configured to classify a plurality of files as malicious (or benign) or clean. Although a generally binary classification scheme is described, the file classification system 124 may be configured to classify files in more than one manner and/or the classification may include more than two options (e.g., a sliding scale of how clean or malicious a file may be).

As further illustrated, the computing system 110 can include a memory 112, a file classification system 114, a centroid generation system 116, and/or an update system 118. Similar to above, the memory 112 may be configured to store a plurality of files and/or software for controlling operation of the computing system 110. In some aspects, the computing system 110 may be in communication with a database 130, and can additionally or alternatively use the database 130 for file storage. Although illustrated separately, the computing system 110 can operate as a server which includes the database 130.

The file classification system 114 may be similar to the file classification system 124 on the endpoint, in that the file classification system 114 may be configured to process and/or classify files (e.g., as malware, benign, or clean). However, the file classification system 114 may include additional functionalities which are not present on the file classification system 124 of the endpoint 120, such as an ability to process files from multiple endpoints 120 and/or utilize machine learning to more appropriately classify files. In some embodiments, the file classification system 124 on the endpoint 120 may not be configured to process as much information as the file classification system 114 of the computing system 110, which can save valuable processing resources for other processes running on the endpoint 120.

In various embodiments, either or both of the file classification systems 114, 124 can be configured to utilize centroids to identify and/or classify files. As referred to herein, a centroid can be a space (e.g., geometric or otherwise) in which files are classified as malicious, benign, clean, and/or the like. Although centroids are generally described as being used for the classification of malicious files, centroids can be used for other file classification schemes. Furthermore, centroids can be used as part of an ensemble of multiple different types of models (some or all of which may be centroid-based models) that in parallel and/or in serial fashion analyze a particular file or portion thereof. In some cases, there can be cascading models in which the centroids are used to route files/samples to other specific models (as opposed to a binary determination of some sort). Additional details on the contents and use of centroids are provided below. The centroid generation system 116 may be used to create centroids for use by either or both of the file classification systems 114, 124, as described herein. In order to provide updates to the file classification system 124 at the endpoint 120, the computing system 110 may utilize an update system 118. For example, the update system 118 may be configured to provide patches containing information on a current set of centroids to the endpoint 120. Thus, the endpoint 120 may be able to stay up to date and increase the likelihood of preventing an attack (e.g., prevent the endpoint 120 from opening a worm, Trojan horse, spyware, and/or the like as the computing system 110 accounts for their possible existence).

In some implementations, the computing system 110 can communicate with an external service provider 140. For example, the computing system 110 can communicate directly with the external service provider 140 and/or may communicate over the network 150 with the external service provider 140. The external service provider 140 can be configured to receive information and/or provide information in order to provide a software/application/processing service to the computing system 110 and/or an endpoint 120. For example, in some aspects, the external service provider 140 can provide additional functionalities which the computing system 110 may not be enabled to perform.

In some cases, there can be intermediate operations prior to the file classification system 114 and/or the file classification system 124 processing and/or classifying files (e.g., as malware, benign, or clean). For example, the output of the centroid generation system 116 can comprise routing centroids (sometimes referred to herein as indicator centroid) which can cause a particular sample/file to be routed (e.g., by uploading from the endpoint 120 to the computing system 110) to a secondary mechanism (e.g., a different type of computer-implemented model) for further analysis and/or to provide for a different workflow (such as sending an electronic notification, etc.). More information regarding indicator centroids are provided below.

As one example, the endpoint 120 scans a file and determines that it is a sample compiled with .NET code. It is determined that the .NET sample falls in a .NET centroid which causes the endpoint 120 to cause the .NET sample to be uploaded to a secondary model on the computing system 110 which is designed to expertly analyze only .NET samples. The secondary model executed on the computing system 110 then returns a classification to the end point.

Figure 2:
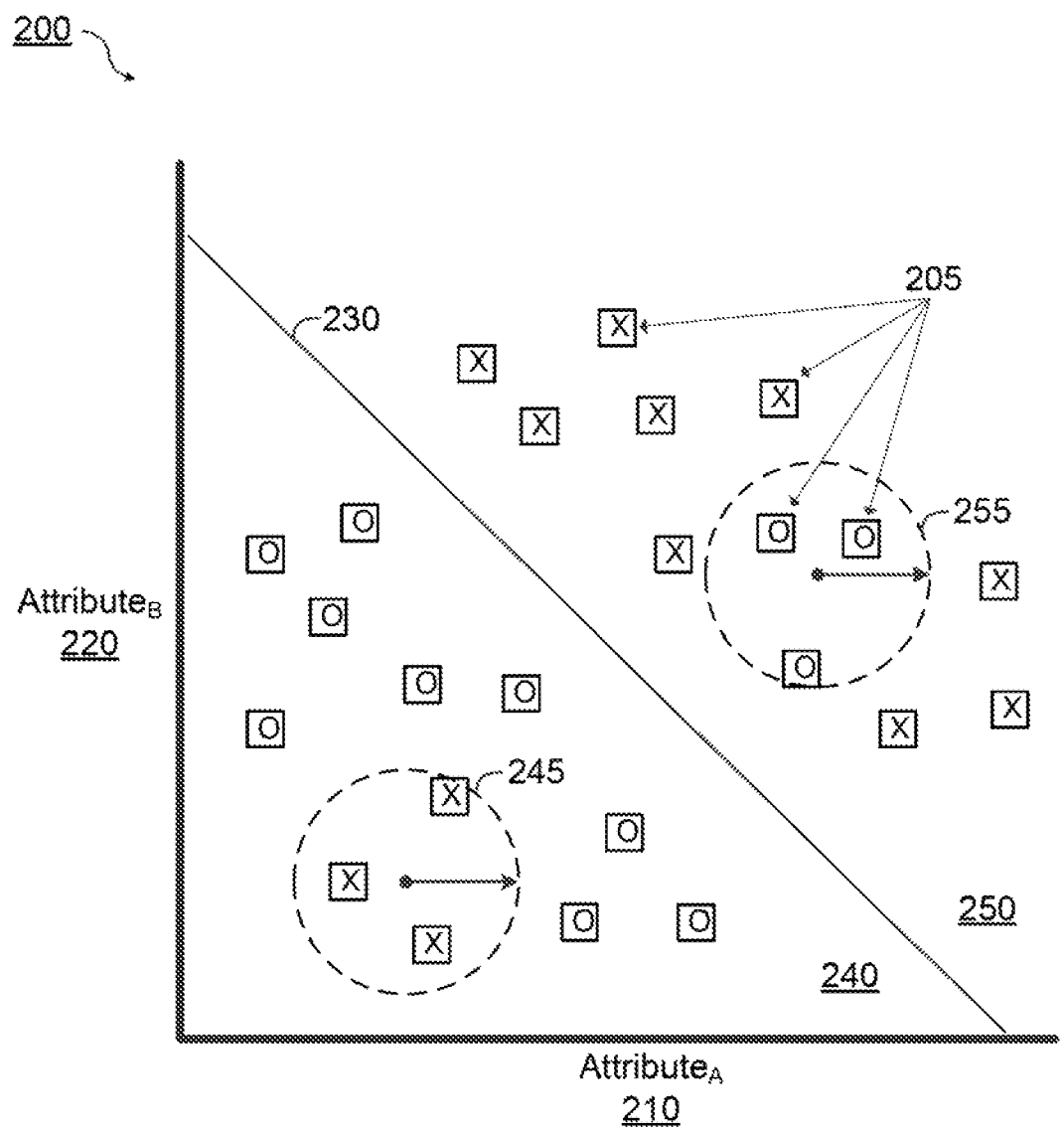
FIG. 2 illustrates an example mapping of a plurality of files in space.

FIG. 2 illustrates an example mapping 200 of a plurality of files 205 in space. In some aspects, the mapping 200 can be referred to as a "feature space." As illustrated, the mapping 200 can be a two-coordinate system based on an intersection of attribute$_A$ 210 and attribute$_B$ 220. However, one or both of the attributes 210, 220 may be a complex attribute and/or the mapping 200 can be an N-coordinate system, where N represents the number of attributes used for file classification. In some embodiments, N may include all known attributes of a file 205. If more attributes are used to classify the files 205, it may be more likely that malicious (or benign) files 205 are grouped together and/or that clean files 205 are grouped together. However, some attributes may not be as relevant or may be counterproductive to a file classification scheme, and may not be considered in the mapping 200. Although the mapping 200 is illustrated as only containing an intersection of positive values for attribute$_A$ 210 and positive values for attribute$_B$ 220, negative values can be additionally or alternatively used, where applicable.

As illustrated, the mapping 200 can include a decision boundary 230 which divides the mapping 200 into a lower portion 240 and an upper portion 250. In the illustrated embodiment, the lower portion is generally considered to contain files 205 which are clean, and the upper portion 250 is generally considered to contain files 205 which are malicious. However, as illustrated, there may be malicious files 205 in the lower portion 240 which were not properly classified by the decision boundary 230. Similarly, there may be clean files 205 in the upper portion 250 which were not properly classified by the decision boundary 230. Thus, methods for identifying these improper classifications and/or properly identifying malicious and/or clean files 205 are provided. For example, the centroid 245 in the lower portion 240 may be utilized to identify a region of the lower portion 240 in which malicious files are located. Similarly, the centroid 255 in the upper portion 250 may be utilized to identify a region of the upper portion 250 in which clean files are located. Thus, some combination of the decision boundary and the centroids 245, 255 can be used to properly classify the files 205 (e.g., as malicious, benign, clean, safe, etc.). Although the decision boundary 230 is illustrated as a linear function, other functions are possible, such as an exponential function, a sine function, a logarithmic function, some combination thereof, and/or the like. In some aspects, a coordinate space can be divided into more than two regions. For example, in some embodiments, a space can be divided into a non-malicious region, a malicious region, and an adware region. Any number of regions can be used with the classifications described herein (e.g. safe, suspect, benign, unsafe, malicious, non-malicious, downloader, Trojan, adware), and/or the like. In various embodiments, more than one decision boundary 230 can be used to accomplish multiple divisions. Further, although the lower portion 240 is described as classifying malicious files and the upper portion 250 is described as classifying clean files, the opposite may be true and/or the classification based on the location of files 205 relative to the decision boundary 230 can vary.

As above, the centroids 245, 255 may be defined by and/or represented as geometric shapes. For example, the centroid 245 can be defined by at least a center point and radius such that the centroid 245 includes a circle. In this example, the region within the circle of the centroid 245 can be considered as a region in which malicious files are located. This region can be excluded from a search for clean files and/or included in a search for malicious files. As such, centroids can be used to indicate portions of the mapping 200 where the files 205 are misclassified, portions of the mapping 200 where malicious files 205 are located, and/or portions of the mapping 200 where clean files 205 are located. Various systems and methods for creating centroids are described herein. Although the centroids 245, 255 are illustrated as circles, other geometric shapes are possible, such as triangles, rectangles, pentagons, polygons, and/or other geometric shapes, which can extend to more than two dimensions.

In some aspects, the centers of the illustrated files 205 can represent the actual location of the files 205. However, these illustrations are merely demonstrative, and the relative locations of the files 205 may not be the same in actual embodiments. For example, while a file 205 is located near the edge of the centroid 245, in some embodiments, the location of this file 205 may be exactly on the boundary line of the centroid 245. However, as described herein, an offset can be used such that the file 205 is not located exactly on the boundary.

In some aspects, when a system model is updated (e.g., attributes for the files 205 are added, removed, altered, etc.), the locations of at least a portion of the files 205 in the mapping 200 may shift. For example, the shifted locations of the files 205 are illustrated in FIG. 3.

Figure 3:
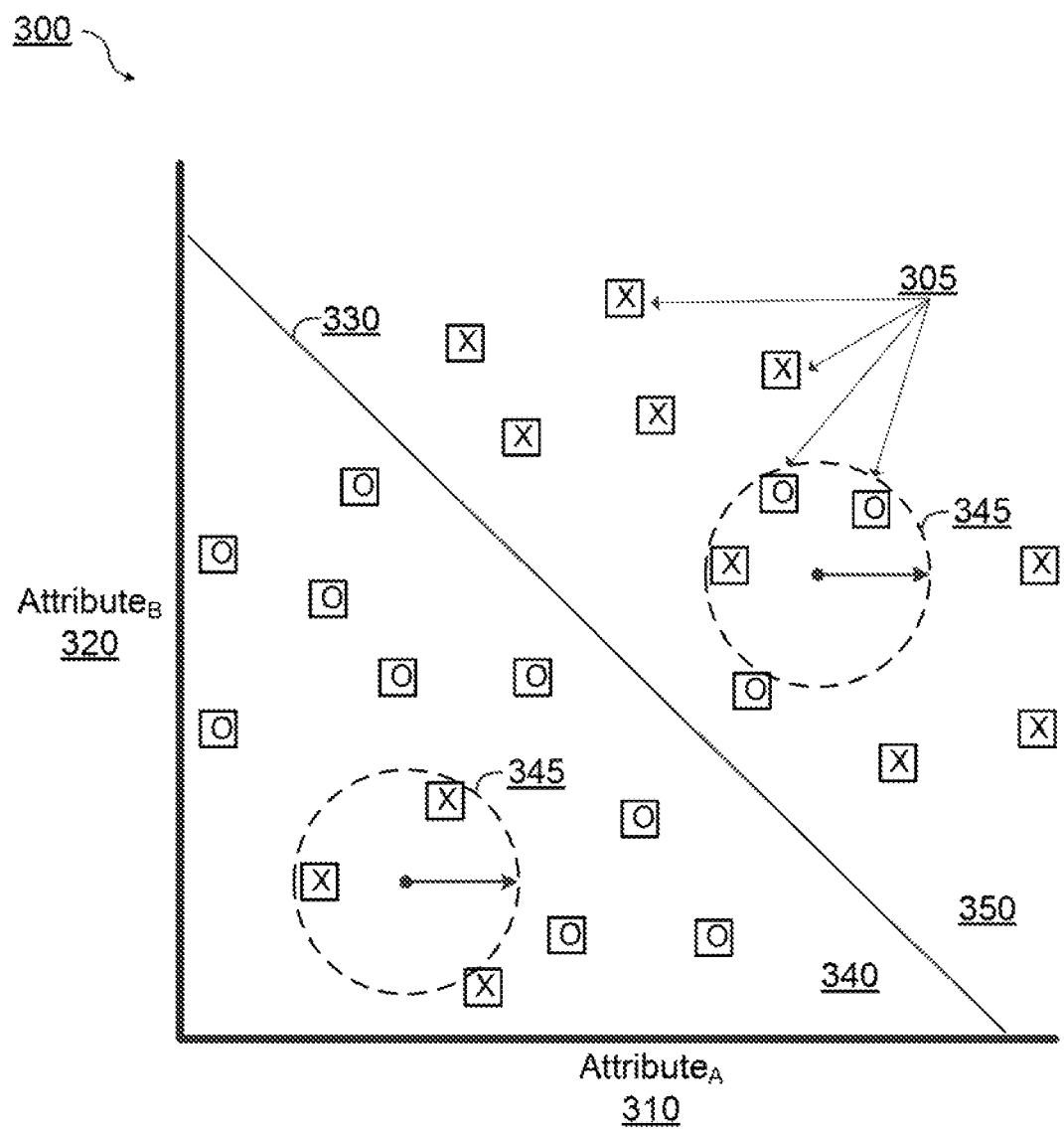
FIG. 3 illustrates an example mapping of a plurality of files in space.

FIG. 3 illustrates an example mapping 300 of a plurality of files 305 in space. The illustrated files 305 can be the same as (or similar to) the files 205 of FIG. 2, but may be classified according to a different set of attributes, which can cause at least some of the files 305 to be mapped to different locations. Similar to FIG. 2, the mapping 300 of the files 305 is based on an intersection of a first attribute$_A$ 310 and a second attribute$_B$ 320, and includes an upper portion 340 and a lower portion 350 separated by a decision boundary 330. The attributes 310, 320 may be the same as or similar to the attributes 210, 220 of FIG. 2, or may account for a different set of file attributes.

As illustrated, not all of the malicious files 305 may be present in the region of the centroid 345 compared to the prior version of the files 205 in the region of the centroid 245 of FIG. 2. Similarly, not all of the clean files 305 may be present in the region of the centroid 355 compared to the prior version of the files 205 in the region of the centroid 255 of FIG. 2, and/or malicious files 305 may now be present within the region of the centroid 355. Thus, one or more of the centroids 345, 355 may need to be redefined after a system update/rebuild.

Figure 4:
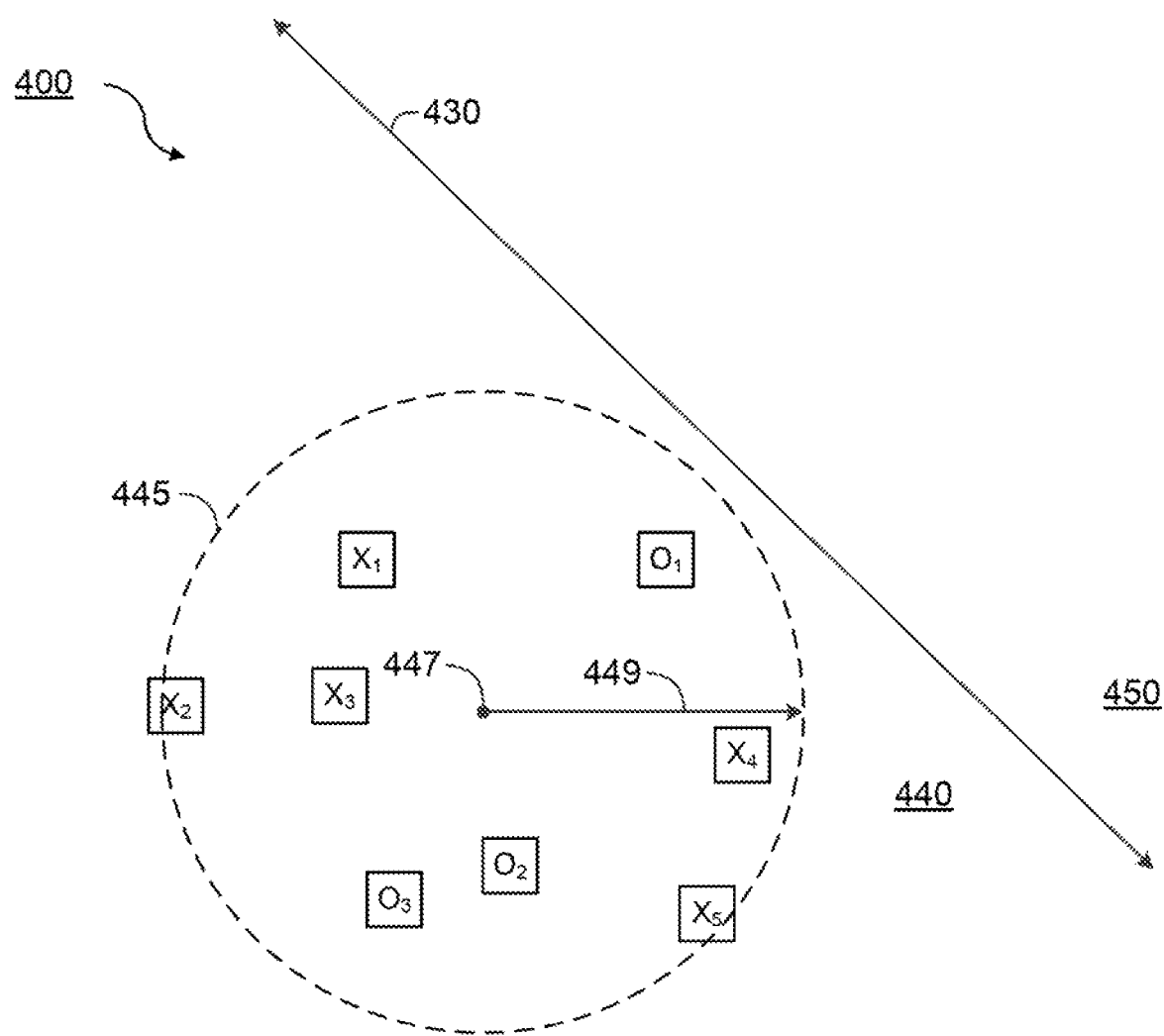
FIG. 4 illustrates an example of a mapping including a centroid.

FIG. 4 illustrates an example of a mapping 400 including a centroid 445. As illustrated, the centroid 445 may be located in the lower portion 440 of a mapping 400 (defined at least in part by the decision boundary 430).

In some embodiments, the mapping 400 can be formed by mapping files according to two or more attributes associated with the files. The files that are mapped can include test/training files which are known to be malicious and/or files which are known to be non-malicious. Once the mapping 400 is formed, a decision boundary 430 can be formed to separately classify malicious (and/or benign) and non-malicious (and/or non-benign) files. In some embodiments, the decision boundary 430 may not be used, and a region inside or outside a plurality of centroids can be searched.

After the mapping 400 is formed, clusters of files can be identified based on one or more clustering algorithms. For example, one or more of a density-based spatial clustering of applications with noise (DBSCAN) algorithm, a k-mean clustering, hierarchical agglomerative clustering, and/or the like may be used to identify and/or group clusters of files in the mapping. In the illustrated mapping 400, files $X_{1-5}$ may be identified as being part of a cluster of malicious files in the lower portion 440 that is used to classify files as non-malicious. Thereafter, the centroid 445 may be generated such that it includes all of the files $X_{1-5}$. Specifically, the center point 447 and the radius 449 of the centroid 445 can be generated such that all of the files $X_{1-5}$ are included within the region of the circle formed by the center point 447 and the radius 449.

In various embodiments, centroids can be full-space centroids, full-projected centroids, or subspace centroids. In some embodiments, the files in the mapping 400 can be classified based on N separate attributes. N can include all attributes of the mapped files or some portion thereof. Full-space centroids can be generated based on averaging each of the N attributes for the files in an identified cluster. Subspace centroids, on the other hand, can be generated based on only a portion of the N attributes which are shared by the files in an identified cluster. For example, Table 1 includes an example of attribute values for the plurality of malicious files $X_{1-5}$ identified as a cluster.

TABLE 1

| | Attribute | | | | | | |
|---|---|---|---|---|---|---|---|
| File | 1 | 2 | 3 | 4 | 5 | 6 | 7 |
| $X_1$ | 0 | 1 | 1 | 1 | 1 | 1 | 1 |
| $X_2$ | 0 | 1 | 1 | 1 | 2 | 1 | 2 |
| $X_3$ | 0 | 1 | 1 | 1 | 2 | 2 | 1 |
| $X_4$ | 0 | 1 | 0 | 1 | 4 | 0.5 | 0 |
| $X_5$ | 1 | 1 | 0 | 1 | 5 | 0.5 | 0 |
| Average | 0.2 | 1 | 0.6 | 1 | 2.8 | 1 | 0.8 |

As shown by Table 1, each of the files $X_{1-5}$ can include seven attributes (e.g., N=7). These attributes can be represented by binary values, integer values, fractional values, and/or the like. In order to generate a full-space centroid, the average values for each of the attributes can be calculated, and these values can be used to define the center point 447 (e.g., within a seven-dimensional Euclidean space). Additionally, the Euclidian distance between each of the files $X_{1-5}$ can be calculated. For example, for any two file locations p and q, the Euclidian distance can be determined based on the following formula:

$$d(p, q) = d(q, p)$$
$$= \sqrt{(q_1 - p_1)^2 + (q_2 - p_2)^2 + \ldots + (q_n - p_n)^2}$$
$$= \sqrt{\sum_{i=1}^{n}(q_i - p_i)^2}.$$

In various embodiments, the radius 449 can be set to equal the maximum Euclidian distance between any two of the files $X_{1-5}$. In other embodiments, the radius 449 can be set to equal the maximum distance (e.g., Euclidian) between the center point 447 and any one of the files $X_{1-5}$. In accordance with various embodiments, an offset can be added to the radius 449 such that the centroid is not overly exclusive and/or accounts for computing round-offs. For example, a floating point delta can be set to a small number (e.g., 0.00000001) and added to whatever distance is calculated (e.g., the maximum distance or any other distance). Other methods for determining the radius 449 and/or the distance between points may be used such as Manhattan distance, and/or statistical properties of a group of distances other than a maximum may be used (e.g., mean, median, mode, etc.).

In order to generate a subspace centroid, the values for each of the attributes which are shared among all of the files can be calculated, and these values can be used to define the center point 447. For example, in Table 1, Attribute$_2$ and Attribute$_4$ have a "1" common to all of the files $X_{1-5}$. Therefore, a center point 447 of a subspace centroid for the files $X_{1-5}$ can be defined with a value of "1" in Attribute$_2$ and Attribute$_4$, and a value of "0" in the remaining attributes. Similar to above, the distance between the files $X_{1-5}$ can be calculated, and the maximum distance can be set as the radius 449. However, in other embodiments, the radius can be set to equal "1", and only Attribute$_2$ and Attribute$_4$ are searched to determine whether an unknown file can be considered as part of the subspace centroid. In related embodiments, an unknown file might only be regarded as part of the subspace centroid if the distance between the center point 447 and the file is exactly "1" for the searched attributes (e.g., Attribute$_2$ and Attribute$_4$). The remaining attributes may be ignored for this purpose. In some aspects, the center point 447 of a subspace centroid might only be based on attributes where all clustered files (e.g., files $X_{1-5}$) equal "1". However, other values are possible.

Full-projected centroids can be similar to full-space centroids, but may be based on a scan of only a subset of the file attributes. For example, when "scanning" (e.g., reviewing attributes of files with known classifications) for clusters to generate centroids, only some of the attributes of the files will be used to determine how close files are to each other (e.g., to identify clusters). This subset of attributes can be manually selected and/or may be selected/controlled through machine learning. In some aspects, once clusters are identified, the centroids defined to encompass the files may be based on all of the attributes of the files. Not doing so could possibly exclude a file (e.g., the radius of the centroid may be too small and a file may lie beyond this distance). In some aspects, random projection, principal component analysis, and/or related techniques can be used to map attributes in a higher dimensional space to a lower dimensional space.

Although Euclidian distance is used for several measurements described herein, other distance measurement techniques may additionally or alternatively be used. For example, an L1-norm distance, a cosine distance, and/or the like. Although the upper portion 450 is not discussed, it may be scanned in a manner similar to the lower portion 440, and/or centroids may be defined within the upper portion 450 based on the scan. Although the centroids are not illustrated as crossing over the decision boundaries, in some embodiments, the centroids may be defined in such a manner that they do. For example, in some embodiments, the region of the centroid 445 may cover portions of the mapping 400 on both sides of the decision boundary. In this case, the centroid 445 could be defined to include only malicious files or only clean files, and may be utilized in a search accordingly.

Although the centroid 445 includes multiple files $X_{1-5}$ which were misclassified as safe files, the centroid 445 also includes multiple files $O_{1-3}$ which are actually safe files. This may be identified by searching the centroid 445 to identify whether it includes any known safe files. In any event, the parameters of the centroid 445 may be modified based on determining that it is over-inclusive, at a risk of being over-inclusive, or based on one or more "hyper parameters." For example, in some aspects, a maximum value of a radius can be set, and any centroid which is generated that includes a radius that is greater than the maximum value can be reduced until it is equal to or less than the maximum value. In some aspects, this can require two or more centroids to cover the regions which were previously covered by one centroid, but this may also decrease the likelihood of misclassification. However, increasing the number of centroids can increase the amount of computing resources necessary to conduct a file search. Therefore, machine learning can be utilized (e.g., via an iterative process) to determine values for one or more of the hyper parameters that provide an optimized balance of these concerns.

Figure 5:
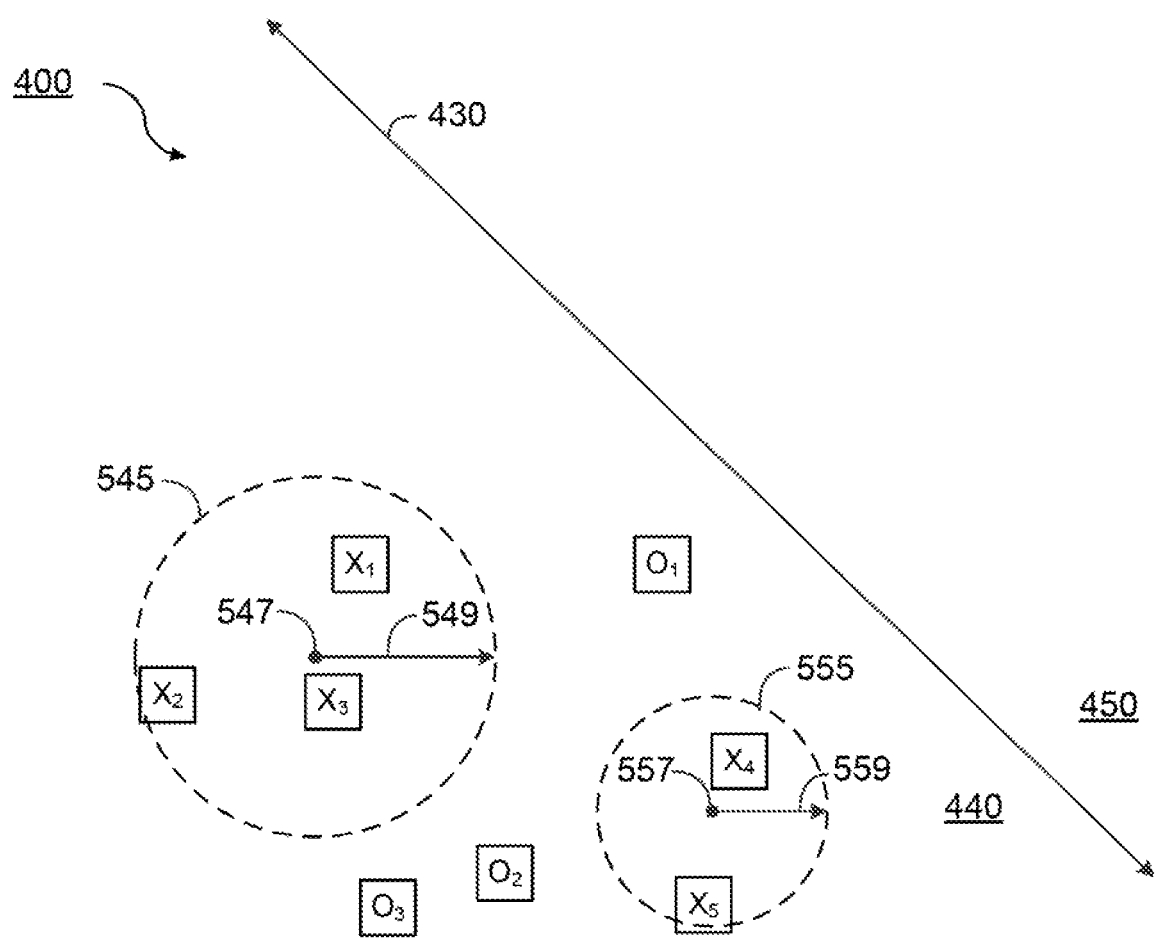
FIG. 5 illustrates another example of the mapping of FIG. 4 including multiple centroids.

FIG. 5 illustrates another example of the mapping 400 of FIG. 4 including multiple centroids 545, 555. As before, the malicious files $X_{1-5}$ are misclassified as clean files, but are actually malicious files. However, the previous centroid 445 was over-inclusive, and reducing the value of the radius 449 was insufficient to remove the safe files $O_{1-3}$ while still keeping the malicious files $X_{1-5}$ within one centroid. Therefore, two centroids 545, 555 may instead be used. In some embodiments, a procedure may be used to determine that files $X_{1-3}$ form a cluster (or a sub-cluster) and/or that files $X_{4-5}$ form another cluster (or sub-cluster). This can be determined based on one or more of the clustering techniques described herein, and/or may be determined based on using distances (e.g., Euclidian) to identify files which are in close proximity to each other (e.g., as compared to other files).

Whichever technique is used to identify additional clusters of files, once the additional clusters are identified a centroid can be generated to encompass the files. For example, as illustrated, centroid 545 can be defined by the center point 547 and the radius 549 such that it includes files $X_{1-3}$. Similarly, centroid 555 can be defined by the center point 557 and the radius 559 such that it includes files $X_{4-5}$. Based on these centroids 545, 555, a search of the mapping 400, for example, may be conducted such that malicious files are excluded.

In some embodiments, once centroids are satisfactorily generated, they may be stored. In order to determine whether the centroids are satisfactory, iterative procedures can be performed. For example, in scanning for clusters, certain parameters may be used such that the identified clusters are more valuable for centroid generation. The parameters can include a maximum and/or minimum number of files per cluster, a maximum and/or minimum distance between files in a cluster, a maximum and/or minimum number of clusters, a maximum and/or a minimum ratio of the number of clusters to the number of files, and/or the like. These parameters can be hyper parameters which apply to all scans for clusters (e.g., a maximum Euclidian distance between any one file in the cluster to any other file), or may be parameters which can be changed from one scan to the next (e.g., a maximum number of files in a cluster).

In some aspects, centroids may not be generated until after identified clusters include certain characteristics. For example, if the files $X_{1-5}$ in FIG. 4 are identified as being too far apart from each other and/or the safe files $O_{1-3}$ are identified as being too close to the cluster (e.g., part of the cluster), then the centroid 445 may never be generated. Instead, another scan for clusters could be performed such that the new clusters which properly exclude the clean files $O_{1-3}$ are identified. Although the stored version of the centroids may not cover all of the re-classifications (e.g., re-classifying malicious files present in a region marked as safe) necessary to correctly classify every single file, the classification system utilizing centroids is more accurate than other classification systems which do not use centroids. Centroid 545 and/or centroid 555 can be defined based on one or more of the techniques described herein, and need not be formed through the same technique.

Whatever methods used to generate centroids, once the centroids are defined, a new file (e.g., a file within an unknown classification) can be compared against a decision boundary and/or the centroids to determine a classification for the file. In some embodiments, comparing a new file can include mapping the new file to a location in the coordinate space based on a plurality of attributes for the new file, comparing the location of the new file against the center points and radiuses of the centroids, and/or comparing the location of the new file against a decision boundary. If the distance between the new file location and the center point of any given centroid is less than or equal to the radius for the centroid, then the new file may be considered as being within the centroid (and may be classified according to a classification of the centroid). If the new file is determined to be located outside of all defined centroids, then the location of the new file can be compared against at least one decision boundary to determine which portion of the coordinate space the new file lies within (e.g., within a portion classified as malicious). Based upon this comparison, one or more classification types may be associated with the new file and/or stored. In some aspects, this comparison can be referred to as "searching" for the file or a classification thereof.

Figure 6:
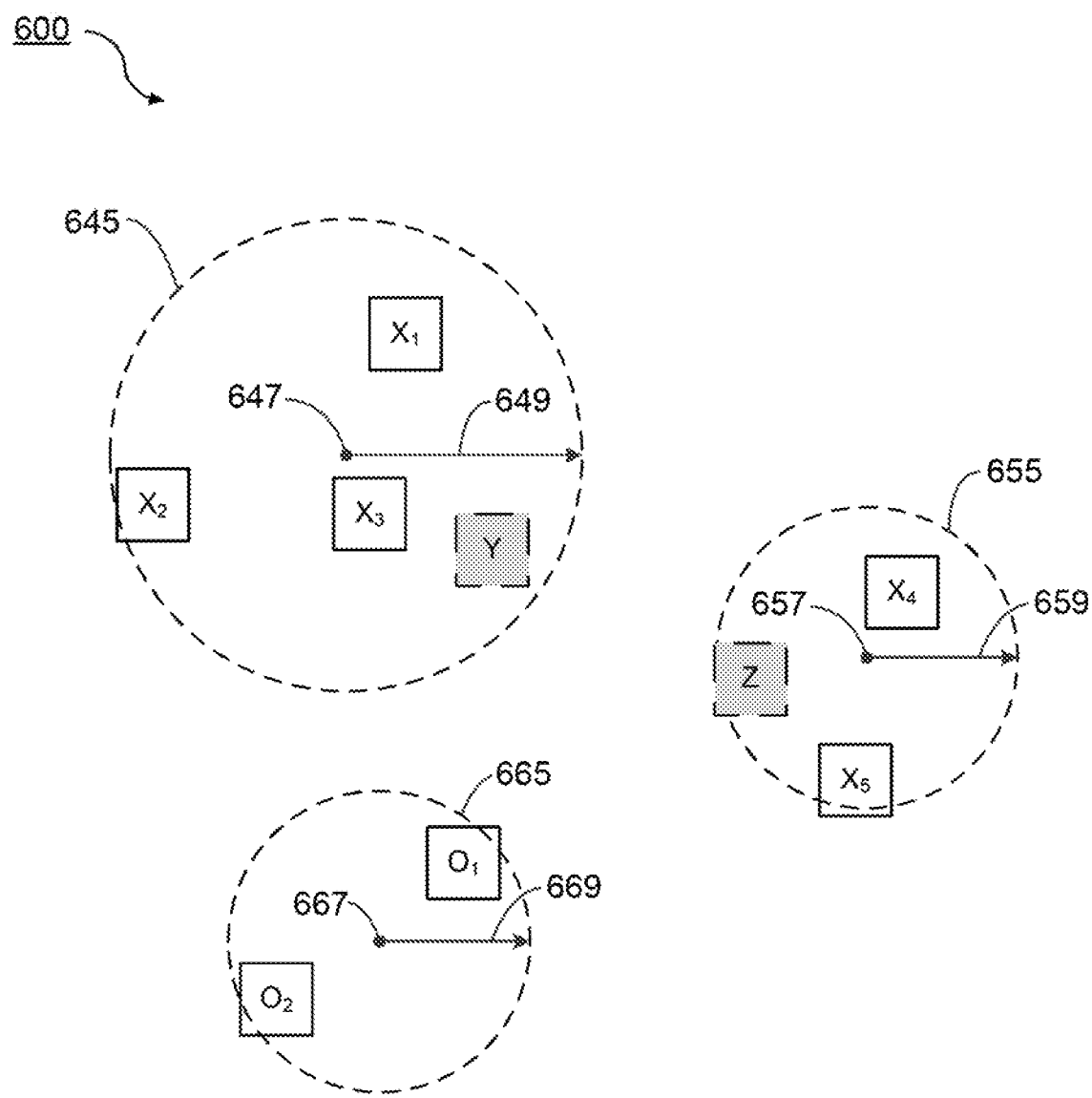
FIG. 6 illustrates an example of a mapping including a plurality of centroids.

In some aspects, centroids can be generated and/or used without the use of a decision boundary 430. For example, FIG. 6 illustrates an example of a mapping 600 including a plurality of centroids 645, 655, 665. In some embodiments, a plurality of training files can be mapped into a coordinate space, and the centroids 645, 655, 665 can be generated based on clustering, regardless of where the files/clusters are located in the coordinate space. In accordance with these embodiments, the training files may be classified according to one or more classifications before (and/or after) the centroids are generated. For example, if the files $X_{1-5}$ are classified as "malware," the centroid 645 can be generated to include files $X_{1-3}$ and the centroid 655 can be generated to include files $X_{4-5}$. Thus, files which are determined to lie within either of the centroids 645, 655 can be classified a malware. Files $O_{1-2}$ can be classified as "clean," and the centroid 665 can be generated to include files $O_{1-2}$.

Once the centroids 645, 655, 665 are generated, files within the centroids 645, 655 (and/or the centroids 645, 655 themselves) can be (re)classified. For example, files $X_{1-3}$ (and/or the centroid 645) can be (re)classified as malware type A and/or files $X_{4-5}$ (and/or the centroid 655) can be (re)classified as malware type B. Thereafter, when new files Y, Z (e.g., files which are not known to be malicious or non-malicious) are compared against the centroids 645, 655, 665, the comparison may classify the new files Y, Z as malware type A if the new file Y is determined to lie within the centroid 645, or may classify the new file as malware type B is the file Z is determined to lie within the centroid 655. Doing so can provide additional insight on the classification of a file, and/or does not require the use of a decision boundary, which can reduce processing time and/or resources necessary to classify files (e.g., prevent the execution of malicious files). In some embodiments, all centroids that exist within the system may be searched, only a portion of the centroids might be searched, and/or the centroids can be searched until a match is found for a given file. In some embodiments, clusters might only be selected and/or centroids might only be generated when a grouping of files is limited to one type (or subtype). As described herein, other classification types and/or subtypes may additionally or alternatively be used.

Figure 7:
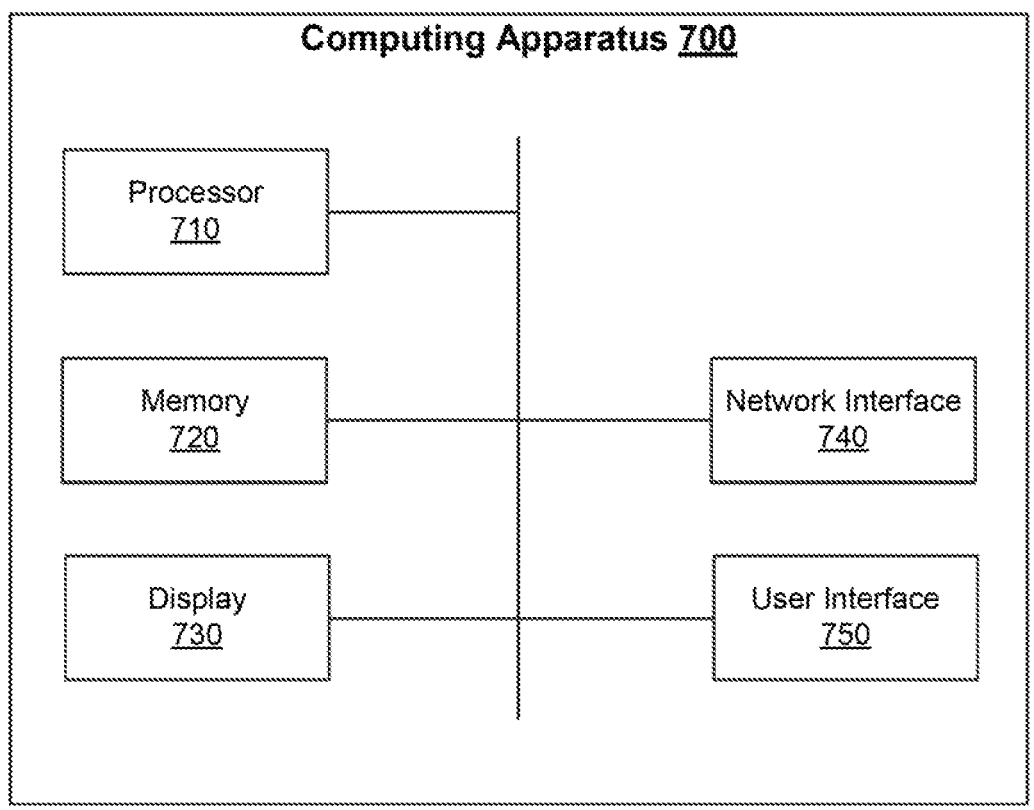
FIG. 7 illustrates an example of a computing apparatus, in accordance with various embodiments.

FIG. 7 illustrates an example of a computing apparatus 700, in accordance with various embodiments. An apparatus consistent with at least a portion of the computing apparatus 700 may be used to implement one or more of the endpoints 120, the computing system 110, the database 130, and/or the external service provider 140. In some aspects, the computing apparatus 700 may be used to perform at least some of the processes described herein. Additionally or alternatively, a plurality of computing apparatus 700 can be used to perform at least some of the processes described herein.

As illustrated, the computing apparatus 700 may include one or more processors such as processor 710 to execute instructions that may implement operations consistent with those described herein. The computing apparatus 700 may include memory 720 to store executable instructions and/or information. Memory 720 may include solid-state memory, solid-state disk drives, magnetic disk drives, or any other information storage device. Memory 720 may provide storage for at least a portion of a database. The computing apparatus 700 may include one or more displays, such as display 730. As illustrated, the computing apparatus 700 may also include a network interface 740 to a wired network or a wireless network, such as the network 150 of FIG. 1. Wireless networks may include WiFi, WiMax, and cellular networks (2G/3G/4G/5G), and/or any other wireless network. The computing apparatus 700 may include one or more user interfaces, such as user interface 750. The user interface 750 can include hardware or software interfaces, such as a keyboard, mouse, or other interface that may include a touchscreen integrated with a display 730.

Figure 8:
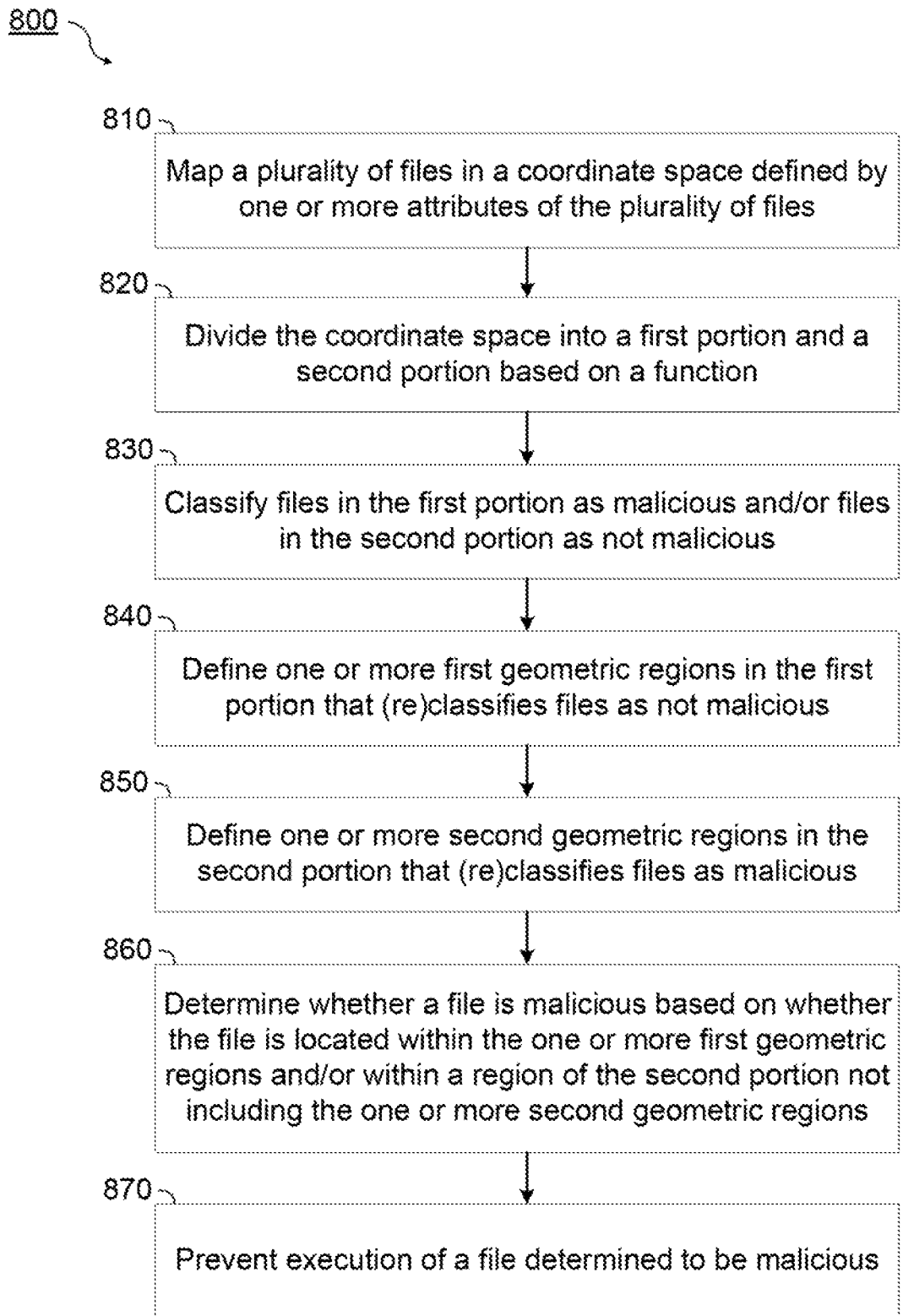
FIG. 8 illustrates an example of a method for classifying files, in accordance with various embodiments.

FIG. 8 illustrates an example of a method 800 for searching for files, in accordance with various embodiments. Although method 800 is illustrated as having a specific operational flow, two or more steps may be combined into a single step, a single step may be performed in one or more steps, one or more of the illustrated steps may not be present in various implementations, and/or additional steps not illustrated may be part of the method 800. In various embodiments, the method 800 may be performed by one or more of an endpoint 120, the computing system 110, the database 130, the external service provider 140, and/or the computing apparatus 700. In some aspects, the computing apparatus 400 may be regarded as a server.

Method 800 may start at operational block 810 where the apparatus 700, for example, maps a plurality of files in a coordinate space defined by one or more attributes of the plurality of files. In some aspects, the coordinate space may be similar to the coordinate space of FIG. 2, defined by $Attribute_A$ 210 and $Attribute_B$ 220, and the plurality of files may be similar to the files 205. In some aspects, the coordinate space can be defined based on an intersection of at least two attributes, or some function of the intersection of the at least two attributes.

Method 800 may next proceed to operational block 820 where the apparatus 700, for example, divides the coordinate space into at least a first portion and a second portion based on a function. In some aspects, the function may be similar to the decision boundary 230 of FIG. 2.

Method 800 may next proceed to operational block 830 where the apparatus 700, for example, classifies files in the first portion as malicious and/or files in the second portion as not malicious. In some aspects, a first subset of the plurality of files in the first portion can be classified as malicious, and/or a second subset of the plurality of files in the second portion can be classified as not malicious. Although malicious and not malicious are described, other classifications may be used.

Method 800 may next proceed to operational block 840 where the apparatus 700, for example, defines one or more first centroids in the first portion that (re)classifies files as not malicious. In some embodiments, the one or more first centroids can be defined such that it includes all of the non-malicious files from the first portion (e.g., the misclassified files). In some aspects, the one or more first centroids can be similar to the centroid 255 in the upper portion 250 of FIG. 2.

Method 800 may next proceed to operational block 850 where the apparatus 700, for example, defines one or more second centroids in the second portion that (re)classifies files as malicious. In some embodiments, the one or more second centroids can be defined such that it includes all of the malicious files from the second portion (e.g., the misclassified files). In some aspects, the one or more first centroids can be similar to the centroid 245 in the lower portion 240 of FIG. 2.

Method 800 may next proceed to operational block 860 where the apparatus 700, for example, searches for a non-malicious file by searching in the one or more first centroids and/or within a region of the second portion not including the one or more second centroids. Although the searching mechanisms described generally relate to malicious and non-malicious files, other file classifications may be utilized such that a classification and search may be for any type of file. Similarly, although the file classification systems described generally use a binary classification (e.g., malicious or not malicious), classifications systems utilizing more than two classifications are possible.

Method 800 may next proceed to operational block 870 where the apparatus 700, for example, prevents execution of a file located in the one or more second centroids or within a region of the first portion not including the one or more first centroids. Determining whether a file is located within a geometric region can include determining whether a distance between a center point of the centroids and a location of the file is less than or equal to a radius of the geometric region. If this is true, then the file can be regarded as being included within the geometric region.

Additionally or alternatively, method 800 can include the apparatus 700, for example, identifying a plurality of clusters from the plurality of files, determining whether any of the plurality of clusters do not include known malicious files, and/or defining individual centroids around each of the plurality of clusters which do not include known malicious files, wherein the one or more first centroids includes the individual centroids. Similarly, the apparatus 700 can determine whether any of the plurality of clusters include known malicious or benign files, and/or defining individual centroids around each of the plurality of clusters which do include known malicious or benign files. In some embodiments, method 800 can include the apparatus 700, for example, determining whether any of the individual centroids include a radius greater than a threshold value, reducing the radius of the individual centroids which are greater than the threshold value such that the radius is less than or equal to the threshold value, and/or re-defining, after the reducing, the individual centroids which no longer include all files from a respective cluster of the plurality of clusters, wherein the re-defining includes defining multiple smaller centroids in place of the individual centroids.

In some aspects the one or more first centroids can include a circular (and/or spherical) geometry having a center point and a radius. Additionally or alternatively, the center point can be determined based at least in part on averaging locations for each of the plurality of files located within the one or more first centroids. Similarly, the center point can be determined based at least in part on averaging shared attributes for each of the plurality of files located within the one or more first centroids. In related aspects, the radius can be determined based at least in part on a maximum Euclidian distance between each of the plurality of files located within the one or more first centroids.

Figure 9:
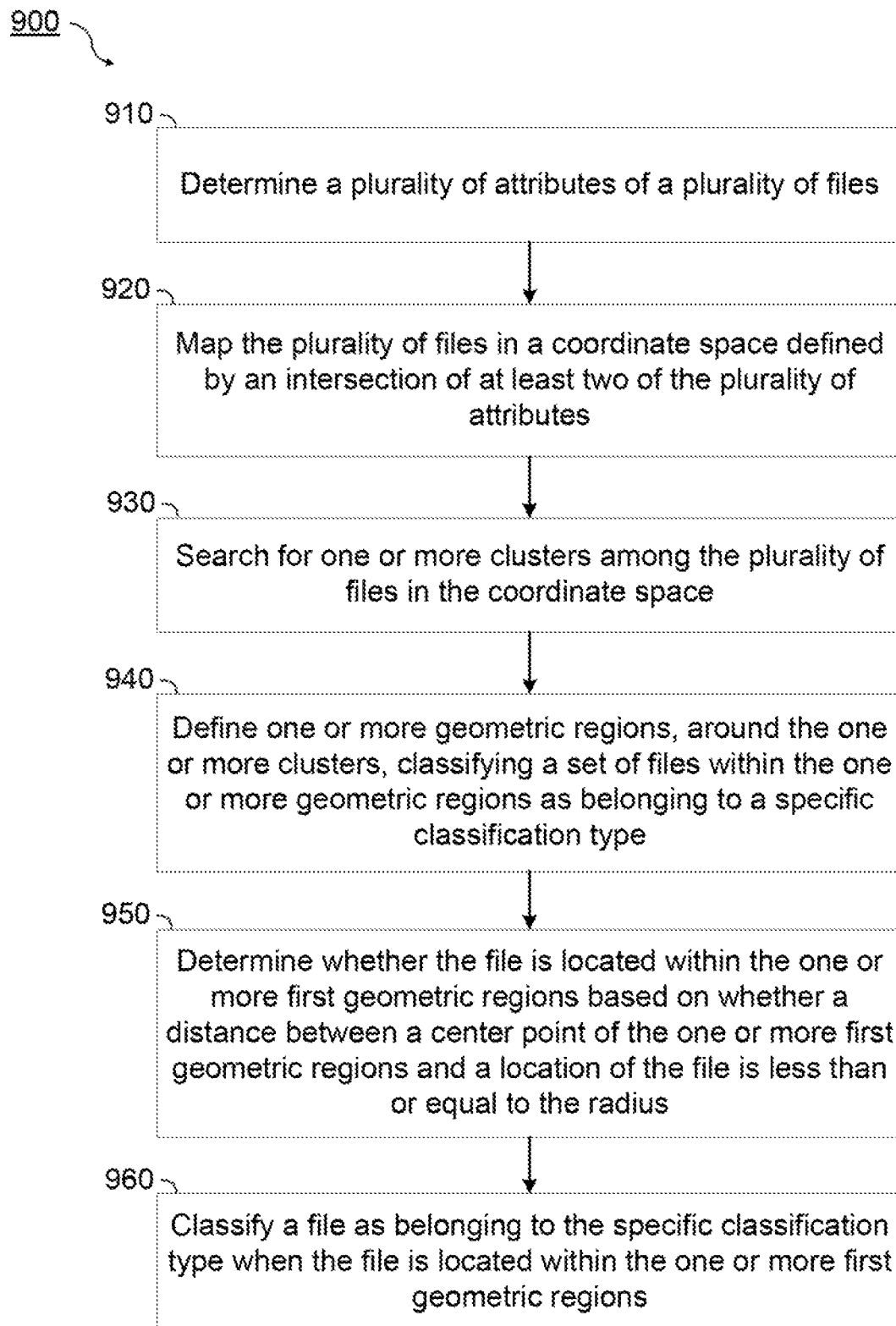
FIG. 9 illustrates another example of a method for classifying files, in accordance with various embodiments.

FIG. 9 illustrates another example of a method 900 for searching for files, in accordance with various embodiments. Although method 900 is illustrated as having a specific operational flow, two or more steps may be combined into a single step, a single step may be performed in one or more steps, one or more of the illustrated steps may not be present in various implementations, and/or additional steps not illustrated may be part of the method 900. In various embodiments, the method 900 may be performed by one or more of an endpoint 120, the computing system 110, the database 130, the external service provider 140, and/or the computing apparatus 700. In some aspects, the computing apparatus 400 may be regarded as a server.

Method 900 may start at operational block 910 where the apparatus 700, for example, determines a plurality of attributes of a plurality of files. These attributes can include any number of salient data points that can be measured from a file, characterizing a file and/or the environment in which the file is being, read, downloaded, executed, written to, and/or the like.

Method 900 may next proceed to operational block 920 where the apparatus 700, for example, maps the plurality of files in a coordinate space defined by an intersection of at least two of the plurality of attributes. The coordinate space can be N-dimensional, where N corresponds to the number of attributes used to process the plurality of files.

Method 900 may next proceed to operational block 930 where the apparatus 700, for example, searches for one or more clusters among the plurality of files in the coordinate space. The clusters can be identified through a database scan or other method, as described herein.

Method 900 may next proceed to operational block 940 where the apparatus 700, for example, defines one or more centroids, around the one or more clusters, classifying a set of files within the one or more centroids as belonging to a specific classification type. The one or more first centroids can be centroids, which are created and/or used as described herein. In some aspects, the one or more first centroids can include a circular geometry, and/or can have a center point and a radius. The center point can be determined based on averaging locations for each of the plurality of files located within the one or more first centroids. In some embodiments, the center point can be determined based on shared attributes for each of the plurality of files located within the one or more first centroids. The radius can be determined based on a maximum Euclidian distance between each of the plurality of files located within the one or more first centroids.

Method 900 may next proceed to operational block 950 where the apparatus 700, for example, determines whether the file is located within the one or more first centroids based on whether a distance between a center point of the one or more first centroids and a location of the file is less than or equal to the radius. Distance can be calculated through Euclidian distance between a location of the file and a location of the center points, or other methods of determining distances between two points in an N-dimensional space.

Method 900 may next proceed to operational block 960 where the apparatus 700, for example, classifies a file as belonging to the specific classification type when the file is located within the one or more first centroids. In some aspects, the specific classification type can include one or more of safe, suspect, benign, unsafe, malicious, non-malicious, downloader, Trojan, adware, and/or the like. If the file is determined to be malicious, it may be prevented from being executed and/or a warning can be provided regarding the file. Malicious can refer to viruses, worms, Trojan horses, spyware, and/or programming that gathers information about a computer/user without permission.

As mentioned above, indicator centroids can act to alter a machine learning-based workflow whether it to be to treat a file or other artifact in a different manner or simply to trigger a notification (which can be displayed on an electronic visual display, stored locally on physical persistence, loaded into memory, and/or transmitted to a remote computing system).

Figure 10:
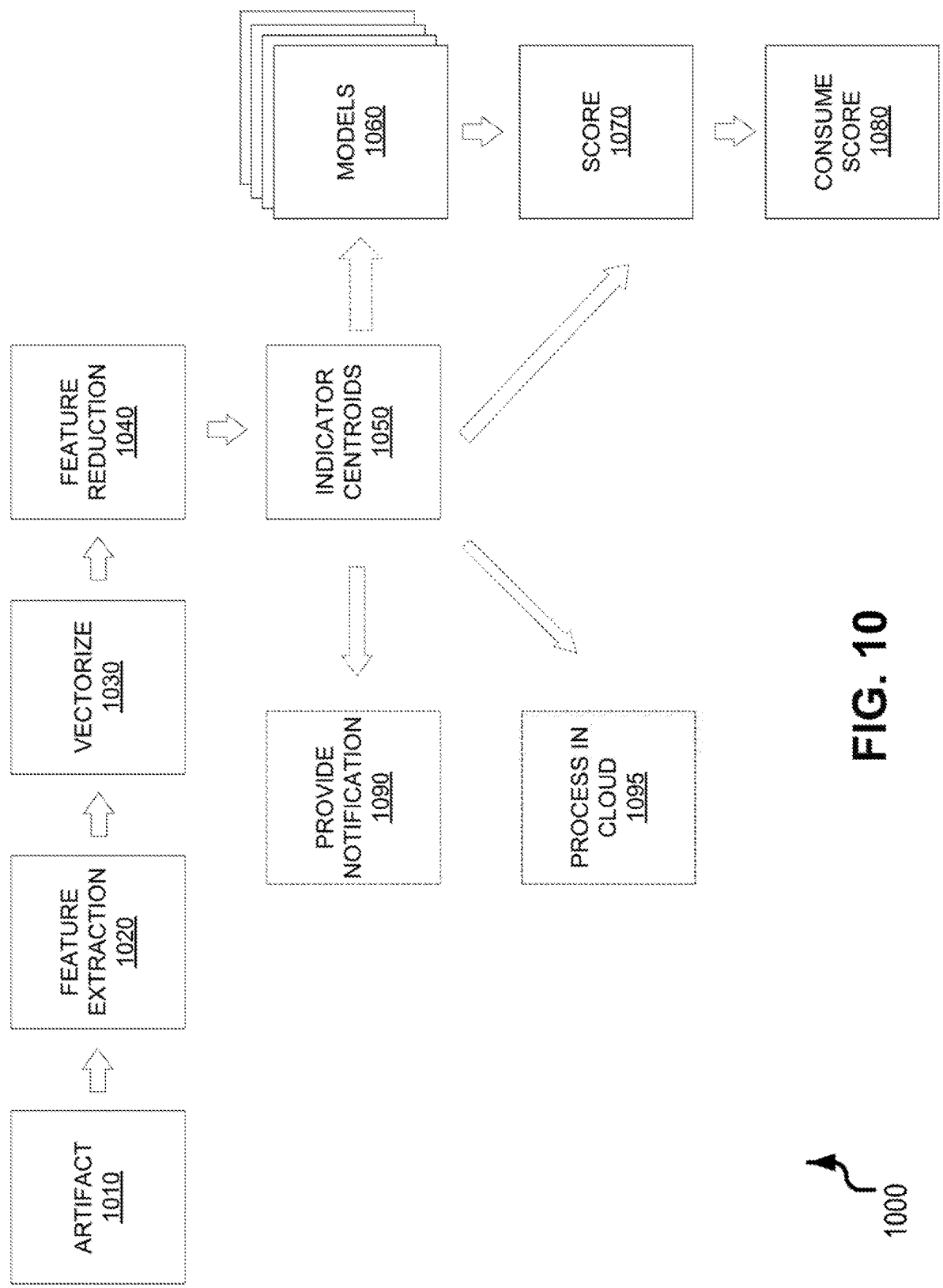
FIG. 10 is a diagram illustrating a sample malware processing workflow.

FIG. 10 is a diagram 1000 illustrating a sample workflow in which, at 1010, an artifact (i.e., file, document, code, etc.) is initially received. Thereafter, at 1020, features are extracted to form vectors 1030. In some variations, the features in the vector can be reduced, at 1040, using a feature reduction technique such as principal component analysis or via random projection matrices. The resulting features can be input into an indicator centroid 1050. The indicator centroid 1050, depending on whether a certain action is triggered, can, for example, continue the workflow so that the vector is analyzed using one or more machine learning models 1060 which in turn provides a score 1070 which then can be consumed, at 1080, by one or more processes. Such processes, can, for example, prevent the artifact 1010 from being executed, from being further executed, and/or to quarantine the artifact 1010. The indicator centroid 1050 in some variations can override (or bypass) and/or be additive the score 1070 generated by the machine learning models 1060. In addition or in the alternative, the indicator centroid 1050 can provide notifications 1090 to be provided. Further, the indicator centroid 1095 can cause the workflow to be shifted into the cloud so that the vector can be analyzed using a heavier machine learning model (i.e., a model that requires more computing power that might be available locally, etc.).

Indicator centroids 1050 are important because, in some cases, alternatives to black and white centroids (centroids which provide a binary output of −1.0 or +1.0) which can override an incorrect model score for specific groups of samples (and which provide an effective means of improving model accuracy without the need to update the base model) can be needed. For example, there may be a need to make finer adjustments to a machine-learning based scoring process than just overriding a model score with a value such as −1.0 or +1.0. Indicator centroids 1050, as provided herein, provide the ability to extract supplemental information from the vectorizing process that can indicate how a sample should be processed or routed (i.e., affect the workflow as part of a machine-learning based classification process).

When classifying malware samples, the indicator centroids 1050 can be particularly helpful in address certain types of situations. As one example, NSIS packed executables that can contain Cerber malware which may require routing to the cloud for additional processing (given the complexity of accurately classifying such executables). The Indicator centroids 1050 can be advantageous in that they do not require changes to the underlying machine learning model and/or workflow process (which can be time consuming and also requires consumption of computing resources). The indicator centroids 1050 can also be used with NSIS and other packed executables so that they can be unpacked and processed by the local model and the indicator centroids 1050 can provide heuristics to determine how they should be scored. Hard coding these heuristics or rules (as opposed to utilizing an indicator centroid 1050) would require doing a model update to adjust for new malware designs.

In addition, the indicator centroids 1050 can provide a very powerful mechanism to select on specific features that may indicate use of a technology. In the case of NSIS packed executable, an indicator centroid 1050 can simply indicate that this sample is NSIS packed, without the implication of forcing the score to black or white. Similar indicator centroids 1050 can be developed for other packers and any other problem areas, as long as any of the features used as input to a given model are helpful for identifying that technology. The indicator centroids 1050 can include a target identifier that determines which module or subsystem the result is directed to, and based on this the result might be processed directly by the models 1060, to generate a score 1070, to alter a score 1070 generated by the models 1060, to provide a notification 1090, or to process at a remote computer 1095 such as in the cloud. In some variations, whether the indicator centroids 1050 run before, after, or in parallel with the models 1060 is not important.

The indicator centroids 1050, in some variations, can include an element called notify which specifies targets and actions that should be taken in the workflow as an alternative to normal processing (i.e., local scoring by the machine learning models 1060, etc.). In some variations, each indicator centroid, as an output, can specify a target, an action, and a threshold. Examples of notify actions can include the following:

"Score In Cloud Over Local" where the presence of packed material cannot be sufficiently analyzed by the loaded models 1060 (causing the processing to occur in the cloud 1095).

"Unpack Packer And Score Children" which indicates that items in the artifact should be unpacked in a container and attempt to score each of those sub-items using the models 1060.

"Unpack Packer Convict Encrypted Blob" which indicates that items in the artifact should be unpacked in a container, an entropy calculation can be conducted on each item, and the artifact 1010 is convicted (as being malicious) if there is an encrypted BLOB of sufficient size, specified by a parameter in the indicator centroid 1050.

"Track File Manipulates Registry" which indicates that the artifact 1010 includes code that calls APIs that make registry changes.

"Track File Manipulates Boot Record" which indicates that the artifact 1010 that includes code that calls APIs that manipulate the boot record.

"Track File Hooks Operating System" which indicates that the artifact 1010 that includes code that calls APIs that hook the operating system APIs.

"Track File Document With Scripts" which indicates that the artifact 1010 is a document (e.g. PDF, DOC, DOCX, XLSX, etc.) that contains non-trivial scripting code.

"Track File Document With Phishing" which indicates that the artifact 1010 is a document (e.g. PDF, DOC, DOCX, XLSX, etc.) that contains suspicious URLs or other indicators of phishing material.

"Track File Installs Packed Apps" which indicates that the artifact 1010 that contains unpacker technology or calls APIs that unpack and install applications on the target system.

"Track File Special Content" which indicates that the artifact 1010 contains any kind of material (to be defined at a future date) that justifies tracking it behavior through the system.

In some variations, the indicator centroids 1050 will be run on all samples (i.e., artifacts 1010). In other variations, the indicator centroids 1050 are run on a subset of artifacts 1010 (which may be rule-based or based on a classification by the models 1060). Running the indicator centroids 1050 on all artifacts 1010 can differ from the use of black and white centroids where only white are run on negative scores, black on positive scores, and analysis stops on the first black or white centroid hit.

The indicator centroids 1050 can support various kinds of "subspace" and "subspacesum" (and "xenospace" and "xenospacesum"). Kinds with a suffix of "sum" can be similar to "subspace" so that a Manhattan distance is computed rather than the Euclidean distance. In some variations, one reason to support only restricted kinds is that indicator centroids 1050 can be run on every sample, and subspace centroids require significantly less processing time than fullspace centroids.

The radius in an indicator centroid 1050 can be used to normalize the data, so that 0.0 indicates that the feature is not present, 1.0 indicates that it is clearly there, and anything in-between would indicate the level of certainty of that feature being present. Indicator centroid computation can compute a magnitude by dividing the 'distance' by 'radius' as a means of normalizing the output from 0.0 to 1.0. Calculation of the centroid distance can break early (exit the calculation loop) once the magnitude reaches the edge of the centroid area, as the reported result will never be outside the range 0.0 to 1.0.

A threshold (0.0 to 1.0) that triggers an action can be any value between 0.0 and 1.0. The type field of the indicator centroids 1050 can be populated just as with other centroids, as these operate on the feature vector 1030 of a specific machine learning model 1060.

The indicator centroids 1050, in some variations, is not a scripting or cloud programmable interface. Only those actions that have been specifically designed into the implementation and associated applications can be triggered by the indicator centroids 10950.

Figure 11:
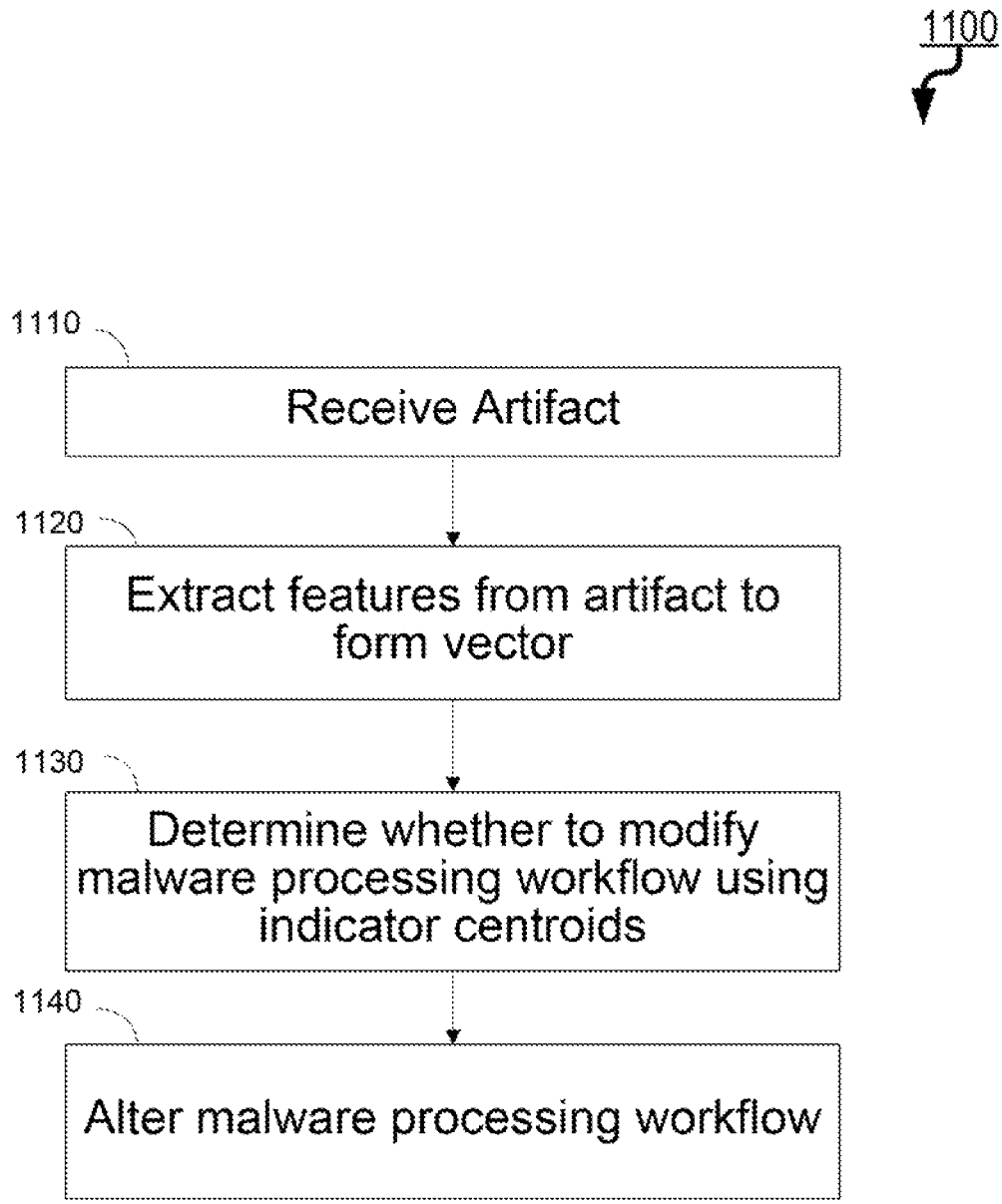
FIG. 11 is a diagram illustrating an altering of a malware processing workflow as in FIG. 10 using an indicator centroid.

FIG. 11 is a process flow diagram in which, at 1110, an artifact is received. Thereafter, at 1120, features are extracted from the artifact to form a feature vector. Subsequently, at 1130, a determination is made to alter a malware processing workflow based on a distance of one or more features in the feature vector relative to one or more indicator centroids. Each indicator centroid specifies a threshold distance to trigger an action. Next, at 1140, based on the determining, the malware processing workflow is altered.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital MM image capture devices and associated interpretation software, and the like. As used herein, the term "module" refers to software functionality that can be implemented via one or more programmable processors that are part of one or more computing systems.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to also mean, "based in part on" and/or "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claims.

The invention claimed is:

1. A computer-implemented method comprising:
   receiving an artifact;
   extracting features from the artifact to form a feature vector;
   determining to alter a malware processing workflow based on a distance of one or more features in the feature vector relative to one or more indicator centroids, each indicator centroid specifying a threshold distance to trigger an action; and
   altering, based on the determining, the malware processing workflow from a first machine learning-based classification workflow to a second machine learning-based classification workflow.

2. The method of claim 1 further comprising:
   inputting, as part of either of the first machine-learning based classification workflow or the second machine-learning based classification workflow, the feature vector into at least one machine learning model trained to generate a score that characterizes whether the artifact comprises malicious code.

3. The method of claim 2 further comprising:
   preventing the artifact from being executed or from continuing to execute when the at least one machine learning model indicates that the artifact comprises malicious code.

4. The method of claim 1, wherein the altering comprises:
   transmitting, as part of the second machine-learning based classification workflow, the feature vector to a remote computing system based on an action specified by an indicator centroid, the remote computing system providing a classification of the artifact based on the transmitted feature vector.

5. The method of claim 4, wherein the remote computing system provides the classification by executing at least one machine learning model.

6. The method of claim 1, wherein the altering comprises:
   transmitting, as part of the second machine-learning based classification workflow, the artifact to a remote computing system based on an action specified by an indicator centroid, the remote computing system providing a classification of the artifact based on the transmitted feature vector.

7. The method of claim 6, wherein the remote computing system provides the classification by executing at least one machine learning model.

8. The method of claim 1, wherein the altering comprises:
   providing a notification based on an action specified by a corresponding indicator centroid.

9. The method of claim 8, wherein the providing the notification comprises at least one of:
   causing the notification to be displayed in an electronic visual display, storing the notification in physical persistence, loading the notification in memory, transmitting the notification to a remote computing device.

10. The method of claim 2, wherein the altering comprises:
    altering the score generated by the at least one machine learning model based on an action specified by a corresponding indicator centroid.

11. A system comprising:
    at least one data processor; and
    memory storing instructions which, when executed by the at least one data processor, result in operations comprising:
    receiving an artifact;
    extracting features from the artifact to form a feature vector;
    determining to alter a malware processing workflow based on a distance of one or more features in the feature vector relative to one or more indicator centroids, each indicator centroid specifying a threshold distance to trigger an action; and
    altering, based on the determining, the malware processing workflow from a first machine learning-based classification workflow to a second machine learning-based classification workflow.

12. The system of claim 11, wherein the operations further comprise:
- inputting, as part of either of the first machine-learning based classification workflow or the second machine-learning based classification workflow, the feature vector into at least one machine learning model trained to generate a score that characterizes whether the artifact comprises malicious code.

13. The system of claim 12, wherein the operations further comprise:
- preventing the artifact from being executed or from continuing to execute when the at least one machine learning model indicates that the artifact comprises malicious code.

14. The system of claim 11, wherein the altering comprises:
- transmitting, as part of the second machine-learning based classification workflow, the feature vector to a remote computing system based on an action specified by an indicator centroid, the remote computing system providing a classification of the artifact based on the transmitted feature vector.

15. The system of claim 14, wherein the remote computing system provides the classification by executing at least one machine learning model.

16. The system of claim 11, wherein the altering comprises:
- transmitting, as part of the second machine-learning based classification workflow, the artifact to a remote computing system based on an action specified by an indicator centroid, the remote computing system providing a classification of the artifact based on the transmitted feature vector.

17. The system of claim 16, wherein the remote computing system provides the classification by executing at least one machine learning model.

18. The system of claim 11, wherein the altering comprises:
- providing a notification based on an action specified by a corresponding indicator centroid, the notification comprising at least one of: causing the notification to be displayed in an electronic visual display, storing the notification in physical persistence, loading the notification in memory, or transmitting the notification to a remote computing device.

19. The system of claim 12, wherein the altering comprises:
- altering the score generated by the at least one machine learning model based on an action specified by a corresponding indicator centroid.

20. A non-transitory computer program product comprising instructions which, when executed by at least one computing device, result in operations comprising:
- receiving an artifact;
- extracting features from the artifact to form a feature vector;
- determining to alter a malware processing workflow based on a distance of one or more features in the feature vector relative to one or more indicator centroids, each indicator centroid specifying a threshold distance to trigger an action; and
- altering, based on the determining, the malware processing workflow from a first machine learning-based classification workflow to a second machine learning-based classification workflow.

* * * * *

UNITED STATES PATENT AND TRADEMARK OFFICE
CERTIFICATE OF CORRECTION

| | | |
|---|---|---|
| PATENT NO. | : 11,501,120 B1 | Page 1 of 1 |
| APPLICATION NO. | : 16/796843 | |
| DATED | : November 15, 2022 | |
| INVENTOR(S) | : Eric Glen Petersen et al. | |

It is certified that error appears in the above-identified patent and that said Letters Patent is hereby corrected as shown below:

On the Title Page

Item (63), in Related U.S. Application Data Section, delete "Continuation of" and
Insert -- Continuation-in-Part of --, therefor.

Signed and Sealed this
Fifth Day of November, 2024

Katherine Kelly Vidal
*Director of the United States Patent and Trademark Office*